US011465378B2

(12) United States Patent
Chen

(10) Patent No.: US 11,465,378 B2
(45) Date of Patent: Oct. 11, 2022

(54) METHOD FOR PREPARING SHOE SHELL, AND TWICE OPENING-MOLD SHOE-MAKING MOLD

(71) Applicant: DONGGUAN RAISE SHOE MATERIAL LIMITED, Dongguan (CN)

(72) Inventor: Zhaozhu Chen, Dongguan (CN)

(73) Assignee: DONGGUAN RAISE SHOE MATERIAL LIMITED, Dongguan (CN)

( * ) Notice: Subject to any disclaimer, the term of this patent is extended or adjusted under 35 U.S.C. 154(b) by 418 days.

(21) Appl. No.: 16/618,072

(22) PCT Filed: Dec. 22, 2017

(86) PCT No.: PCT/CN2017/117985
§ 371 (c)(1),
(2) Date: Nov. 27, 2019

(87) PCT Pub. No.: WO2019/090923
PCT Pub. Date: May 16, 2019

(65) Prior Publication Data
US 2020/0156340 A1    May 21, 2020

(30) Foreign Application Priority Data
Nov. 8, 2017  (CN) .......................... 201711090240.5

(51) Int. Cl.
*B29D 35/00*     (2010.01)
*B29D 35/12*     (2010.01)
(Continued)

(52) U.S. Cl.
CPC ............ *B29D 35/0072* (2013.01); *A43B 1/10* (2013.01); *A43B 7/12* (2013.01); *B29C 37/006* (2013.01);
(Continued)

(58) Field of Classification Search
CPC ............ B29D 35/0063; B29D 35/0072; B29D 35/128; B29D 35/0018; B29D 35/0027;
(Continued)

(56) References Cited

U.S. PATENT DOCUMENTS

2007/0102843 A1* 5/2007 Waatti ................... B29C 33/306
264/239
2018/0147802 A1* 5/2018 Isse ......................... A43B 13/14

FOREIGN PATENT DOCUMENTS

CN           203611425 U   *  5/2014

OTHER PUBLICATIONS

Translation of CN 203611425 U (Year: 2014).*

* cited by examiner

*Primary Examiner* — Niki Bakhtiari
*Assistant Examiner* — John J DeRusso
(74) *Attorney, Agent, or Firm* — Houtteman Law LLC

(57) ABSTRACT

A method for preparing a shoe shell using a twice-opening-mold shoe-making mold comprises steps of preparing rubber for the shoe shell and cutting the rubber for the shoe shell into elongated or square sizes; heating the twice-opening-mold shoe-making mold to required temperatures within 3 hour; and opening the twice-opening-mold shoe-making mold with the bottom mold of the twice-opening-mold shoe-making mold being opened in a direction away from the mold main body of the twice-opening-mold shoe-making mold; putting the rubber for the shoe shell into the twice-opening-mold shoe-making mold; closing the bottom mold towards the mold main body, lifting the mold inner edge of the twice-opening-mold shoe-making mold to be stored into the mold main body until the bottom mold and the mold main body are closed, and performing a heating for 2-8 minutes; separating the bottom mold from the mold main body periodically during heating; reopening the twice-open- (Continued)

ing-mold shoe-making mold; taking out a semi-finished shoe shell; and trimming the semi-finished shoe shell.

4 Claims, 6 Drawing Sheets

(51) Int. Cl.
  *B29C 37/00* (2006.01)
  *A43B 1/10* (2006.01)
  *A43B 7/12* (2006.01)
  *B29D 35/02* (2010.01)
(52) U.S. Cl.
  CPC ......... *B29D 35/0018* (2013.01); *B29D 35/02* (2013.01); *B29D 35/128* (2013.01)
(58) Field of Classification Search
  CPC .... B29D 35/061; B29D 35/065; B29D 35/02; B29D 35/0054; A43B 1/10; B29C 37/006
  See application file for complete search history.

METHOD FOR PREPARING SHOE SHELL, AND TWICE OPENING-MOLD SHOE-MAKING MOLD

TECHNICAL FIELD

The invention relates to a preparation method and mold of a shoe, and in particular to a preparation method and mold of a shoe shell.

BACKGROUND

A traditional shoe making technology is usually complicated since shoe uppers, shoe soles and foot beds need to be made in sequence and then are combined. A matching process of the shoe uppers, the shoe soles and the foot beds requires manual adjustment and glue for pasting. On the one hand, manual work is required in many processes, leading to unstable quality and a high defective rate. On the other hand, a large amount of glue is needed, causing a failure to meet the environment protection requirement. If a preparation method capable of integrally forming the shoe soles, the foot beds and a part of the shoe uppers is provided, the stability of product quality can be improved, and the use amount of the glue can be reduced at the same time.

SUMMARY OF THE INVENTION

Against the defects, the invention aims at providing a method for preparing a shoe shell and a twice-opening-mold shoe-making mold, which realize the effects of integrally forming a shoe sole, a foot bed and a part of a shoe upper without damage at joints and with little material consumption and good environmental protection performance.

The technical solution adopted by the invention for achieving the above purpose is as follows.

A method for preparing a shoe shell comprises the following steps of:

(1) preparing rubber for the shoe shell, and weighing an amount of rubber for the shoe shell required for shoe making;

(2) cutting the rubber for the shoe shell obtained in the step (1) into elongated or square size;

(3) arranging a twice-opening-mold shoe-making mold, comprising a machine table, a bottom mold arranged on the machine table, an oil cylinder arranged in the machine table and connected to the bottom mold, and a mold main body arranged above the bottom mold, a mold cavity being formed in an upper surface of the bottom mold; characterized by further comprising a mold inner core arranged in the mold main body, a mold inner edge arranged below the mold inner core, an upper heating plate arranged above the mold main body, a lower heating plate arranged under the bottom mold, and a lifting mechanism connected between the bottom mold and the mold main body, wherein the mold inner edge extends downwards from the interior of the mold main body to a position below the mold main body and is directly located above the bottom mold;

(4) heating the twice-opening-mold shoe-making mold heating to required temperatures within 3 hours;

(5) opening the twice-opening-mold shoe-making mold with the bottom mold being opened in a direction away from the mold main body and the mold inner edge descending and being exposed;

(6) putting the rubber for the shoe shell obtained in the step (2) into the twice-opening-mold shoe-making mold;

(7) closing the bottom mold towards the mold main body, lifting the mold inner edge to be stored into the mold main body until the bottom mold and the mold main body are closed, and performing a heating for 2-8 minutes;

(8) in a process of the heating, separating the bottom mold from the mold main body periodically for exhausting;

(9) after the heating, reopening the twice-opening-mold shoe-making mold with the bottom mold being opened in a direction away from the mold main body and the mold inner edge descending and being exposed, and taking out a semi-finished shoe shell sleeving the mold inner edge; and

(10) after the semi-finished shoe shell is cooled, trimming the semi-finished shoe shell to obtain a finished shoe shell.

As a further refinement of the present invention, the temperatures required in the step (4) are a machine table temperature of 155-165 DEG C. and a formation mold temperature of 135-140 DEG C.

As a further refinement of the present invention, the step (6) specifically includes:

(6.1) taking a plurality of pieces of elongated rubber for the shoe shell, arranging a plurality of pieces of square rubber for the shoe shell at one end of the plurality of pieces of elongated rubber for the shoe shell, and putting the rubber into the bottom mold, wherein one side where the square rubber for the shoe shell is arranged is positioned at one side of a heel corresponding to the bottom mold; and (6.2) taking a plurality of pieces of square rubber for the shoe shell, arranging the rubber on the mold inner edge in a surrounding manner according to a designed height of the shoe shell, and if the remaining portion of the mold inner edge is not surrounded, supplementing with the square rubber for the shoe shell.

As a further refinement of the present invention, the step (8) specifically includes: in the process of the heating, the bottom mold and the mold main body are periodically separated slightly 5 times for exhausting for 10 seconds each time.

As a further improvement of the invention, the rubber for making the shoe shell in the step (1) adopts the following formula: 4-8 parts of SBR-1502 styrene-butadiene rubber, 8-12 parts of BR-9000 butadiene rubber, 14-18 parts of 3 L natural rubber, 12-16 parts of white carbon black, 2-6 parts of dioctyl adipate, 0.3-0.8 parts of diethylene glycol and 0.2-0.5 parts of anti-wear agents SI-69, 1-3 parts of zinc oxide, 0.2-0.6 parts of ST-stearic acid, 0.10-0.15 parts of SP-antioxidant, 0.5-2 parts of PEG-4000, 0.1-0.3 parts of butylated hydroxytoluene, 0.5-1.5 parts of homogenizing agent AG-202, 0.1-0.2 parts of anti-cracking agent and 3-8 parts of EPDM316.

A twice-opening-mold shoe-making mold applied to the method for preparing the shoe shell described above comprises a machine table, a bottom mold arranged on the machine table, an oil cylinder arranged in the machine table and connected to the bottom mold, and a mold main body arranged above the bottom mold, wherein a mold cavity is formed in the upper surface of the bottom mold. The twice-opening-mold shoe-making mold further comprises a mold inner core arranged in the mold main body, a mold inner edge arranged below the mold inner core, an upper heating plate arranged above the mold main body, a lower heating plate arranged under the bottom mold, and a lifting mechanism connected between the bottom mold and the mold main body, wherein the mold inner edge extends downwards from the interior of the mold main body to a position below the mold main body and is directly located above the bottom mold.

As a further improvement of the present invention, the lifting mechanism comprises a left lifting assembly connected to one side edge of the bottom mold and one side edge of the mold main body, and a right lifting assembly connected to the other side edge of the bottom mold and the other side edge of the mold main body, wherein the left lifting assembly and the right lifting assembly are identical in structure and comprise a fixed plate arranged on the one side edge or the other side edge of the mold main body respectively, and a pull rod connected between the one side edge or the other side edge of the bottom mold and the fixed plate, a slideway is formed in the length direction of the fixed plate, and an upper end of the pull rod is slidably arranged on the slideway.

As a further improvement of the present invention, the bottom mold is arranged on the machine table through a plurality of fixed connection blocks.

As a further improvement of the present invention, a plurality of positioning holes are formed in parts, located on an outer side edge of the mold cavity, of the upper surface of the bottom mold.

The invention has the following beneficial effects:

(1) with the adoption of the integrated shoe shell making technology, the made shoe shell has no seams, and is stronger and more durable compared with those made by a traditional shoe making technology; the amount of rubber for shoe making is reduced at the same time, so that environmental protection is achieved; the shoe shell is comfortable to wear; and the shoe sole and the inner surface of the shoe have good anti-skid properties and wear resistance;

(2) The making technology is simple, a large number of manual operation steps are reduced, the quality stability of the shoe making technology can be more easily maintained, and the labor cost is reduced at the same time;

(3) the shoe shell can be matched with different shoe uppers later according to actual needs, and the shoe shell is particularly adapted to be made into shoes with good waterproof performance such as snow boots or rain boots; and (4) by optimizing and improving an internal structure of the twice-opening-mold shoe-making mold, the motion precision of each structure is improved, the shoe shell is formed at one time, the forming is fast, the technology is greatly simplified, the working efficiency is improved, and the shoe shell product is more wear-resistant and durable.

The described above is an overview of the technical solutions of the present invention, and the present invention will be further described below in combination with the accompanying drawings and specific embodiments.

DETAILED DESCRIPTION OF THE INVENTION

To further illustrate the technical means and efficacy of the present invention for its intended purpose, reference is made to the following detailed description of specific embodiments of the invention taken in combination with the accompanying drawings and preferred embodiments.

Embodiment 1

The embodiment provides a method for preparing a shoe shell, comprising the following steps of.

Figure 2:
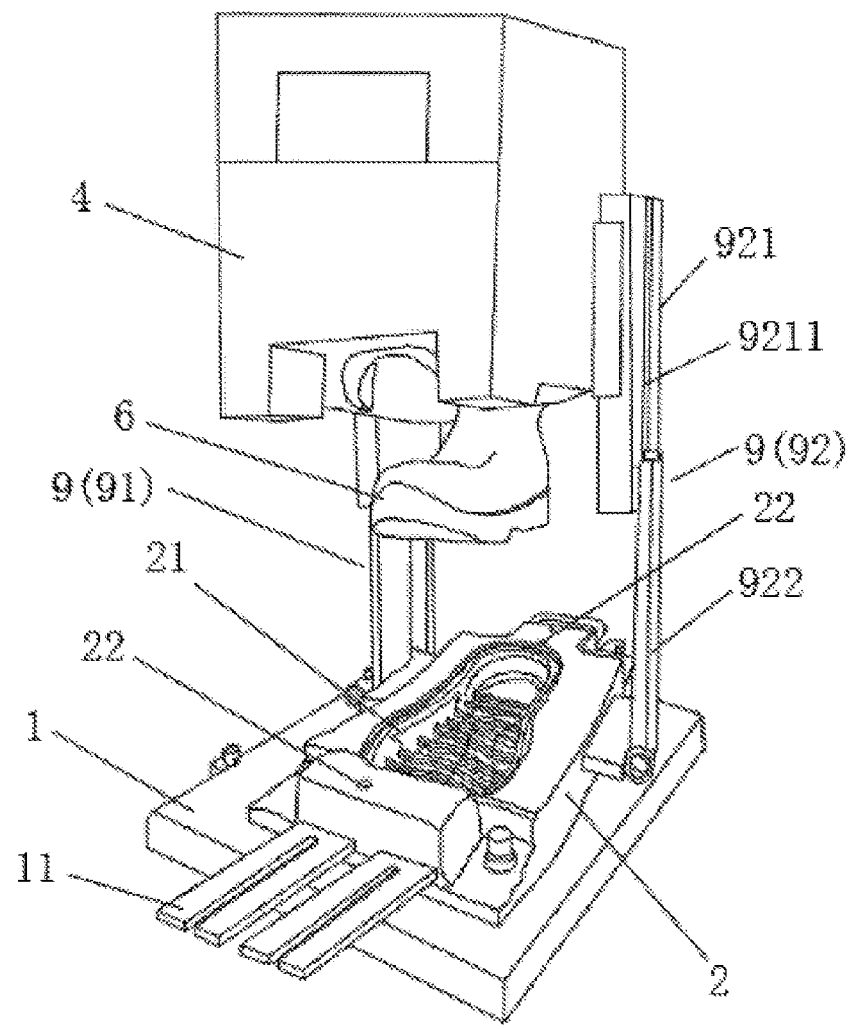
FIG. 2 is a schematic view showing a structure of a twice-opening-mold shoe-making mold of the present invention.
Figure 3:
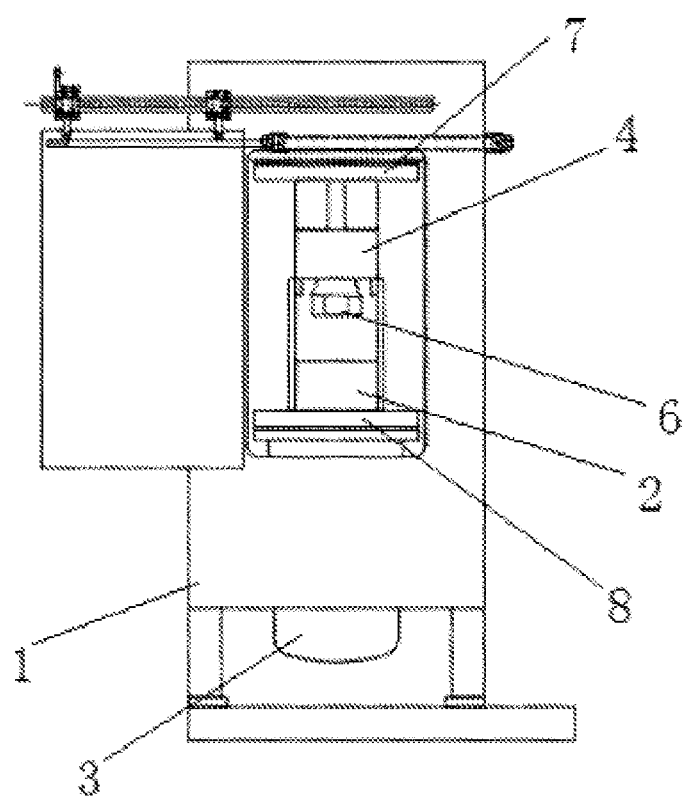
FIG. 3 is a side view of a twice-opening-mold shoe-making mold of the present invention.

(1) preparing rubber for the shoe shell, and weighing an amount of the rubber for the shoe shell required for shoe making;

(2) cutting the rubber for the shoe shell obtained in the step (1) into elongated or square shape;

(3) as shown in FIGS. 2 and 3, arranging a twice-opening-mold shoe-making mold, the mold comprising a machine table 1, a bottom mold 2 arranged on the machine table 1, an oil cylinder 3 arranged in the machine table 1 and connected to the bottom mold 2, and a mold main body 4 arranged above the bottom mold 2, a mold cavity 21 being provided in an upper surface of the bottom mold 2; the mold further comprising a mold inner core arranged in the mold main body 4, a mold inner edge 6 arranged below the mold inner core, an upper heating plate 7 arranged above the mold main body 4, a lower heating plate 8 arranged under the bottom mold 2, and a lifting mechanism 9 connected between the bottom mold 2 and the mold main body 4, wherein the mold inner edge 6 extends downwards from the interior of the mold main body 4 to a position below the mold main body 4 and is directly located above the bottom mold 2;

(4) heating the twice-opening-mold shoe-making mold to required temperatures within 3 hours, namely, the machine table temperature of 155-165 DEG C., and the formation mold temperature of 135-140 DEG C.;

(5) opening twice-opening-mold shoe-making mold with the bottom mold 2 being opened in a direction away from the mold main body 4 and the mold inner edge 6 descending and being exposed;

(6) putting the rubber for the shoe shell obtained in the step (2) into the twice-opening-mold shoe-making mold;

(6.1) taking a plurality of pieces of elongated rubber for the shoe shell, arranging a plurality of pieces of square rubber for the shoe shell at one end of the plurality of pieces of elongated rubber for the shoe shell, and putting the rubber into the bottom mold 2, wherein one side where the square rubber for the shoe shell is arranged is positioned at one side of a heel corresponding to the bottom mold 2; and (6.2) taking a plurality of pieces of elongated rubber for the shoe shell, arranging the rubber on the mold inner edge 6 in a surrounding manner according to a designed height of the shoe shell, and if the remaining portion of the mold inner edge 6 is not surrounded, supplementing with the square rubber for the shoe shell;

(7) closing the bottom mold 2 towards the mold main body 4, lifting the mold inner edge 6 to be stored into the mold main body 4 until the bottom mold 2 and the mold main body 4 are closed, and performing a heating for 2-8 minutes;

(8) in a process of the heating, separating the bottom mold 2 from the mold main body 4 periodically 5 times for exhausting for 10 seconds each time;

(9) after the heating, reopening the twice-opening-mold shoe-making mold with the bottom mold 2 being opened in a direction away from the mold main body 4 and the mold inner edge 6 descending and being exposed, and taking out a semi-finished shoe shell sleeving the mold inner edge 6; and

Figure 1:
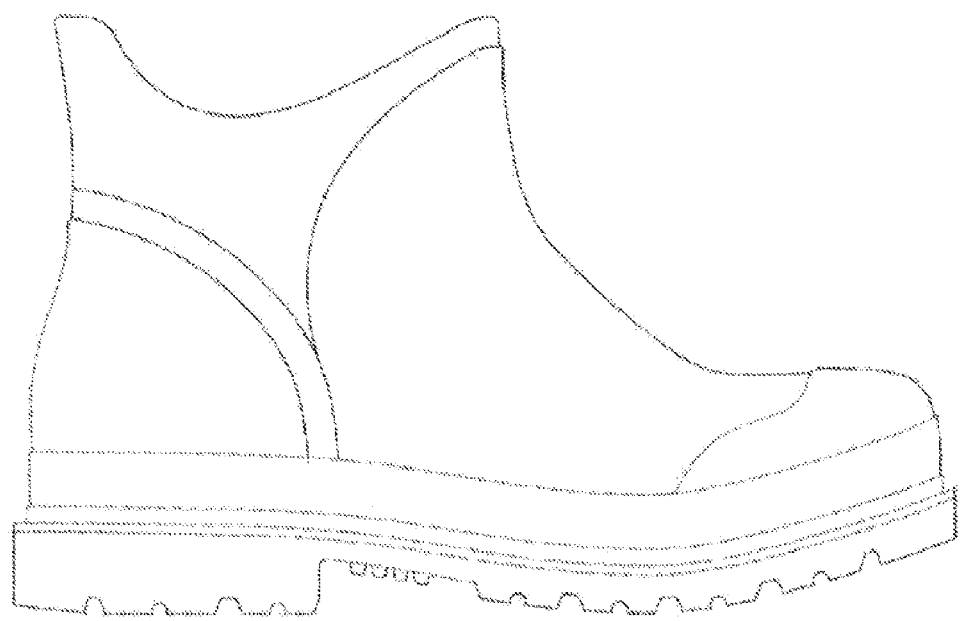
FIG. 1 is a schematic view showing a structure of a shoe shell of the present invention.

(10) after the semi-finished shoe shell is cooled, trimming the semi-finished shoe shell to obtain the finished shoe shell shown in FIG. 1.

As a further improvement of the invention, the rubber for preparing the shoe shell in the step (1) adopts the following formula: 6 parts of SBR-1502 styrene-butadiene rubber, 10 parts of BR-9000 butadiene rubber, 16 parts of 3 L natural rubber, 14 parts of white carbon black, 4 parts of dioctyl adipate, 0.5 parts of diethylene glycol, 0.3 parts anti-wear agent SI-69, 1.5 parts of zinc oxide, 0.4 parts of ST-stearic acid, 0.14 parts of SP-antioxidant, 1 parts of PEG-4000, 0.3 parts of butylated hydroxytoluene, 1 part of homogenizing agent AG-202, 0.15 parts of anti-cracking agent and 5 parts of EPDM316.

Referring to FIGS. 2 and 3, the present embodiment also provides a twice-opening-mold shoe-making mold applied to the method for preparing the shoe shell described above. The twice-opening-mold shoe-making mold comprises a machine table 1, a bottom mold 2 arranged on the machine table 1, an oil cylinder 3 arranged in the machine table 1 and connected to the bottom mold 2, and a mold main body 4 arranged above the bottom mold 2, wherein a mold cavity 21 is formed in an upper surface of the bottom mold 2. The twice-opening-mold shoe-making mold further comprises a mold inner core arranged in the mold main body 4, a mold inner edge 6 arranged below the mold inner core, an upper heating plate 7 arranged above the mold main body 4, a lower heating plate 8 arranged under the bottom mold 2, and a lifting mechanism 9 connected between the bottom mold 2 and the mold main body 4, wherein the mold inner edge 6 extends downwards from the interior of the mold main body 4 to a position below the mold main body 4 and is directly located above the bottom mold 2.

As shown in FIG. 2, the lifting mechanism 9 comprises a left lifting assembly 91 connected to one side edge of the bottom mold 2 and one side edge of the mold main body 4, and a right lifting assembly 92 connected to the other side edge of the bottom mold 2 and the other side edge of the mold main body 4, wherein the left lifting assembly 91 and the right lifting assembly 92 are identical in structure. Detailed description is given below by taking the right lifting assembly 92 as an example. The right lifting assembly 92 comprises a fixed plate 921 arranged on an outer side edge of the mold main body 4, and a pull rod 922 connected between the side edge of the bottom mold 2 and the fixed plate 921, a slideway 9211 is formed in the length direction of the fixed plate 921, and an upper end of the pull rod 922 is slidably arranged on the slideway 9211. The bottom mold 2 moves up and down relative to the mold inner edge 6 and drives the left lifting assembly 91 and the right lifting assembly 92 to provide a bonding force for the combination of the bottom mold 2 and the mold main body 4. At the same time, the fixed plate 921 also plays a role in preventing the mold inner edge from colliding with the bottom mold 2.

Also, the bottom mold 2 is arranged on the machine table 1 through a plurality of fixed connection blocks 11.

In order to prevent the mold from moving, the accuracy of the combination of the mold main body 4 and the bottom mold 2 is improved, so that the product quality of the formed shoe shell is improved, and the product precision is higher. In this embodiment, a plurality of positioning holes 22 are formed in parts, located on an outer side edge of the mold cavity 21, of an upper surface of the bottom mold 2.

Figure 4:
FIG. 4 is a schematic side view of internal structures of a mold main body and a bottom mold of the present invention matched with a mold inner edge.
Figure 5:
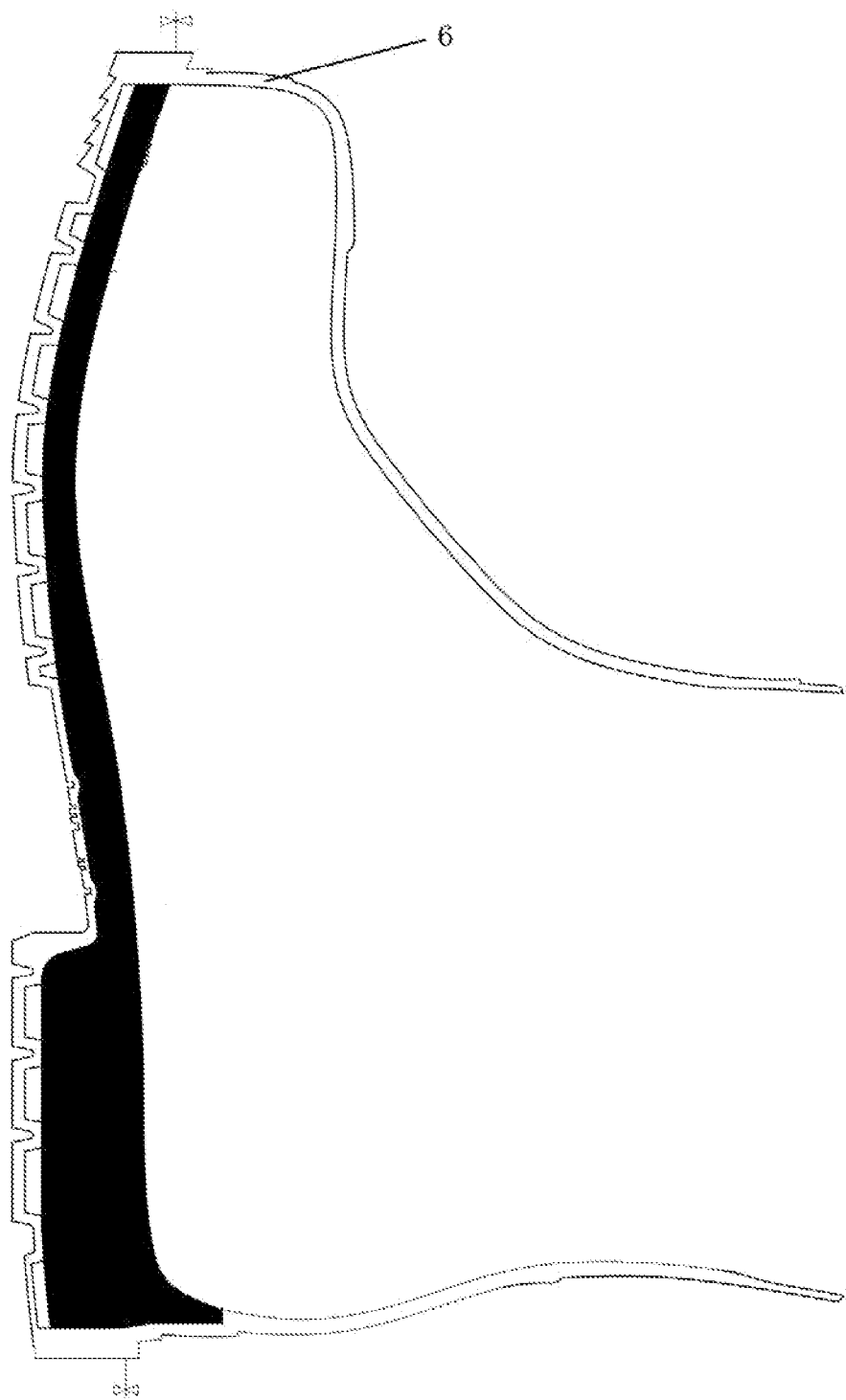
FIG. 5 is a side cross-sectional view of the internal structures of the mold main body and the bottom mold of the present invention matched with the mold inner edge.

As shown in FIGS. 4 and 5, the mold inner edge 6 except a midsole portion used in the present embodiment is shown with a broken line in FIG. 4, the mold inner edge 6 comprising the midsole portion is shown by a solid line on the inner side in FIG. 5, the mold inner edge 6 comprising the midsole portion constitutes the inner side shape of the shoe shell, and a shaded portion in FIG. 5 is the shape of a midsole for subsequently being made into the finished shoe. A hollow space inside the mold main body 4 and an inner space formed by the mold cavity 21 of the bottom mold 2 in this embodiment form the outer shape of the shoe shell as shown with a solid line in FIG. 4 or a solid line on the outer side of FIG. 5, wherein symmetrical triangular mark lines arranged at the two ends serve as a dividing line of the mold main body 4 and the bottom mold 2.

Figure 6:
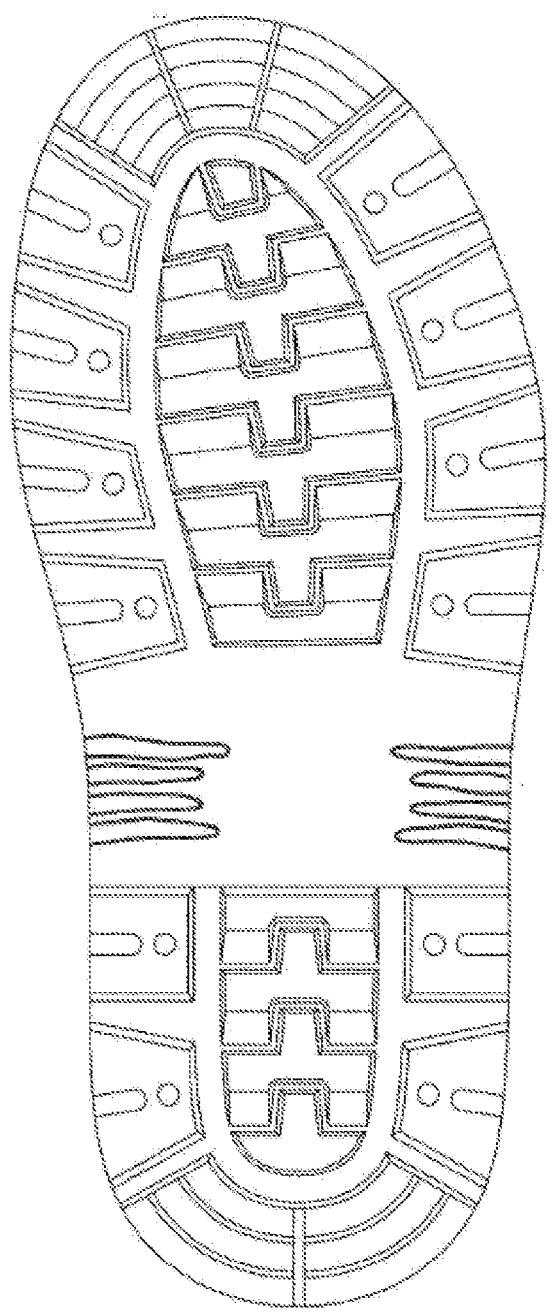
FIG. 6 is a top view of a mold cavity of the bottom mold of the present invention.

As shown in FIG. 6, it is a pattern of the bottom mold 2 used in the present embodiment.

Embodiment 2

This embodiment differs from Embodiment 1 in that:

The rubber for preparing the shoe shell in the step (1) adopts the following formula: 4 parts of SBR-1502 styrene-butadiene rubber, 8 parts of BR-9000 butadiene rubber, 18 parts of 3 L natural rubber, 16 parts of white carbon black, 2 parts of dioctyl adipate, 0.8 parts of diethylene glycol, 0.5 parts of anti-wear agent SI-69, 1 part of zinc oxide, 0.2 parts of ST-stearic acid, 0.15 parts of SP-antioxidant, 2 parts of PEG-4000, 0.1 parts of butylated hydroxytoluene, 0.5 parts of homogenizing agent AG-202, 0.2 parts of anti-cracking agent and 8 parts of EPDM316.

The remaining portions are the same as in Embodiment 1 and will not be described in further detail herein.

Embodiment 3

This embodiment differs from Embodiment 1 in that:

The rubber for preparing the shoe shell in the step (1) adopts the following formula: 8 parts of SBR-1502 styrene-butadiene rubber, 12 parts of BR-9000 butadiene rubber, 14 parts of 3 L natural rubber, 12 parts of white carbon black, 6 parts of dioctyl adipate, 0.3 parts of diethylene glycol, 0.2 parts of anti-wear agent SI-69, 3 parts of zinc oxide, 0.6 parts of ST-stearic acid, 0.10 part of SP-antioxidant, 0.5 parts of PEG-4000, 0.3 parts of butylated hydroxytoluene, 1.5 parts of homogenizing agent AG-202, 0.1 parts of anti-cracking agent and 3 parts of EPDM316.

The remaining portions are the same as in Embodiment 1 and will not be described in further detail herein.

Embodiment 4

The twice-opening-mold shoe-making mold disclosed by the embodiment 1 can also be used for preparing a labor insurance rain shoe, and a method comprises the following steps of:

(1) taking a shoe shell, fully cleaning the inside of the shoe shell with toluene, wherein the shoe shell is made of SBR rubber;

(2) taking a semi-finished foot bed, soaking the semi-finished foot bed in UV modified resin, baking for 3 minutes in an oven at 40-45 DEG C. after the semi-finished foot bed is completely soaked, and then carrying out comprehensive irradiation by using strong light containing ultraviolet light to obtain the foot bed, wherein the EVA surface layer is connected with a layer of resin under the action of ultraviolet light, so that the adhesiveness of a surface of EVA is improved;

(3) attaching a hot melt adhesive film to a lower surface of the foot bed prepared in the step (2), and slightly fixing by using a small ironing bucket;

(4) arranging the shoe shell, pouring rubber liquid paste into the shoe shell, and baking for 5 minutes in the oven at 60-65 DEG C.;

(5) taking the foot bed obtained in the step (3), and completely and firmly sticking the hot melt adhesive film;

(6) taking the shoe shell obtained in the step (4), and completely and firmly sticking a hot melt adhesive film on an edge of the shoe shell;

(7) arranging a shoe last, sleeving the shoe last with a shoe upper made of SBR rubber;

(8) arranging a hot melt adhesive film at a bottom end of the shoe upper, and completely and firmly sticking the hot melt adhesive film;

(9) combining the foot bed obtained in the step (5) and the shoe shell obtained in the step (6);

(10) marking a bottom sleeving mark line on the shoe upper obtained in the step (8) according to the height requirement;

(11) taking a front vertical strip, and polishing according to the bottom sleeving mark line marked in the step (10), so that the front vertical strip is matched with a front end of the shoe upper;

(12) taking a rear vertical strip, and polishing according to the bottom sleeving mark line marked in the step (10), so that the rear vertical strip is matched with a rear end of the shoe upper;

(13) coating the front vertical strip obtained in the step (11) and the rear vertical strip obtained in the step (12) with glue to attach the front vertical strip and the rear vertical strip to the shoe upper;

(14) performing bottom sleeving combination on the shoe upper obtained in the step (13) and the shoe shell obtained in the step (9) to obtain a semi-finished shoe, inspecting the semi-finished shoe, and confirming that a bottom sleeving technology is correct;

(15) sending the semi-finished shoe provided with the shoe last to a vulcanizing box for vulcanizing, and running at 130-135 DEG C. for 15 minutes;

(16) arranging a twice-opening-mold shoe-making mold, and putting the semi-finished shoe obtained in the step (15) into the twice-opening-mold shoe-making mold making mold for pressing with the pressure of 35-40 KG for 6-8 seconds to tightly attach the semi-finished shoe to a shoe mold inner core; and checking if the pressing is in place, and if not, pressing again;

(17) cooling the semi-finished shoe prepared in the step (16), and standing at 4-10 DEG C. for 15 minutes; and

(18) trimming the semi-finished shoe prepared in the step (17), performing waterproof detection on the semi-finished shoe, and obtaining a finished shoe after the waterproof detection passes. A waterproof detection method comprises the following steps that a machine clamps a shoe opening and inflates the shoe with air pressure of 5-8 KG, then the shoe is completely soaked in water, and if bubbles appear in the water, it means the shoe is unacceptable.

The invention mainly focuses on that through optimization and improvement on the internal structure of the twice-opening-mold shoe-making mold, the motion precision of each structure is improved, and the purpose of forming the shoe shell at one time is achieved. The whole process is high in structure operation precision and high speed, the molding speed is high, the technology is greatly simplified and the working efficiency is improved. The shoe shell made by the twice-opening-mold shoe-making mold has no seams, and is stronger and more durable compared with those made by a traditional shoe making technology; the amount of rubber for shoe making is reduced at the same time, so that environmental protection is achieved; the shoe shell is comfortable to wear; and the shoe sole and the inner surface of the shoe have good anti-skid properties and wear resistance.

The embodiments described above are only preferred embodiments of the present invention, and are not intended to limit the technical scope of the present invention in any way. Therefore, any technical feature the same as or similar to the technical features of the above-described embodiments of the present invention, such as using a robot or injection molding to complete production, falls within the scope of the present invention.

The invention claimed is:

1. A method for preparing a shoe shell, characterized by comprising the following steps of:
    (1) preparing rubber for the shoe shell, and weighing an amount of rubber for the shoe shell required for shoe making;
    (2) cutting the rubber for the shoe shell obtained in the step (1) into elongated or square sizes;
    (3) arranging a twice-opening-mold shoe-making mold, comprising a machine table, a bottom mold arranged on the machine table, an oil cylinder arranged in the machine table and connected to the bottom mold, and a mold main body arranged above the bottom mold, a mold cavity being formed in an upper surface of the bottom mold; characterized by further comprising a mold inner core arranged in the mold main body, a mold inner edge arranged below the mold inner core, an upper heating plate arranged above the mold main body, a lower heating plate arranged under the bottom mold, and a lifting mechanism connected between the bottom mold and the mold main body, wherein the mold inner edge extends downwards from the interior of the mold main body to a position below the mold main body and is directly located above the bottom mold;
    (4) heating the twice-opening-mold shoe-making mold to required temperatures within 3 hours;
    (5) opening the twice-opening-mold shoe-making mold with the bottom mold being opened in a direction away from the mold main body and the mold inner edge descending and being exposed;
    (6) putting the rubber for the shoe shell obtained in the step (2) into the twice-opening-mold shoe-making mold;
    (7) closing the bottom mold towards the mold main body, lifting the mold inner edge to be stored into the mold main body until the bottom mold and the mold main body are closed, and performing a heating for 2-8 minutes;
    (8) in a process of the heating, separating the bottom mold from the mold main body periodically for exhausting;
    (9) after the heating, reopening the twice-opening-mold shoe-making mold with the bottom mold being opened in a direction away from the mold main body and the mold inner edge descending and being exposed, and taking out a semi-finished shoe shell sleeving the mold inner edge; and

(10) after the semi-finished shoe shell is cooled, trimming the semi-finished shoe shell to obtain a finished shoe shell.

2. The method for preparing the shoe shell according to claim 1, characterized in that the temperatures required in the step (4) are a machine table temperature of 155-165 DEG C. and a formation mold temperature of 135-140 DEG C.

3. The method for preparing the shoe shell according to claim 1, characterized in that the step (8) specifically comprises: in the process of the heating, separating the bottom mold from the mold main body periodically 5 times for exhausting for 10 seconds each time.

4. The method for preparing the shoe shell according to claim 1, characterized in that the rubber for preparing the shoe shell in the step (1) adopts the following formula: 4-8 parts of SBR-1502 styrene-butadiene rubber, 8-12 parts of BR-9000 butadiene rubber, 14-18 parts of 3 L natural rubber, 12-16 parts of white carbon black, 2-6 parts of dioctyl adipate, 0.3-0.8 parts of diethylene glycol, 0.2-0.5 parts of anti-wear agent, 1-3 parts of zinc oxide, 0.2-0.6 parts of ST-stearic acid, 0.10-0.15 parts of antioxidant, 0.5-2 parts of PEG-4000, 0.1-0.3 parts of butylated hydroxytoluene, 0.5-1.5 parts of homogenizing agent, 0.1-0.2 parts of anti-cracking agent and 3-8 parts of EPDM rubber.

* * * * *